United States Patent [19]

Berg

[11] Patent Number: 4,687,647

[45] Date of Patent: Aug. 18, 1987

[54] CONVERSION OF MOLYBDENITE TO MOLYBDENUM DIOXIDE USING PETROLEUM OR COAL TAR PITCHES

[76] Inventor: Lloyd Berg, 1314 S. Third Ave., Bozeman, Mont. 59715

[21] Appl. No.: 1,623

[22] Filed: Jan. 8, 1987

[51] Int. Cl.$^4$ .................. C01G 39/00; C01G 39/02; C01G 39/06

[52] U.S. Cl. .................. 423/53; 423/59; 423/542; 423/606

[58] Field of Search .......... 423/53, 59, 606, 542; 75/7

[56] References Cited

U.S. PATENT DOCUMENTS

| | | | |
|---|---|---|---|
| 3,770,414 | 11/1973 | Lake et al. ............... | 75/7 |
| 3,957,946 | 5/1976 | Ronzio et al. ............ | 423/54 |
| 4,046,852 | 9/1977 | Vertes et al. ............. | 423/53 |
| 4,165,362 | 8/1979 | Reynolds ................. | 423/606 |
| 4,339,424 | 7/1982 | Jacobson et al. ......... | 423/606 |
| 4,379,127 | 4/1983 | Bauer et al. ............. | 423/53 |
| 4,437,884 | 3/1984 | Hawryluk et al. ........ | 75/7 |
| 4,462,822 | 7/1984 | Sabacky et al. .......... | 75/7 |
| 4,474,735 | 10/1984 | Rastas et al. ............ | 423/53 |
| 4,596,785 | 6/1986 | Toulhoat et al. ......... | 502/220 |

*Primary Examiner*—Patrick P. Garvin
*Assistant Examiner*—Paige C. Harvey

[57] ABSTRACT

Molybdenite, $MoS_2$, is completely converted into molybdenum dioxide, $MoO_2$, by mixing $MoS_2$ with petroleum or coal tar pitches and heating in air at 400°–600° F.

5 Claims, No Drawings

CONVERSION OF MOLYBDENITE TO MOLYBDENUM DIOXIDE USING PETROLEUM OR COAL TAR PITCHES

FIELD OF THE INVENTION

This invention raltes to a method for preparing moybdenum dioxide from molydenite using asphalts or pitches.

DESCRIPTION OF THE PRIOR ART

The most common natural source of molybdenum is molybdenite, $MoS_2$. About 85% of all molybdenum produced is used in the alloying of steel. Stainless steels, tool steels, super alloys and alloy cast irons are the most important. Molybdenite is usually converted to $MoO_3$ by roasting with air, a process which requires a temperature in the range of 1100°–1400° F.

A number of investigators have reported methods of obtainining molybdenum dioxide, $MoO_2$ from $MoS_2$. V. H. Zazhigalov (1975) employed hydrogen and elemental sulfur. N. Satani (1975) used hydrogen-thiophene mixtures to reduce the $MoO_3$ hydrate to $MoO_2$. J. O. Besenhard (1976) carried out the reduction of $MoS_2$ in dimethylsulfoxide. A. Wold (1964) prepared pure $MoO_2$ crystals by the electrolytic reduction of $MoO_3$—$NaMoO_4$ solution. W. Kunnman (1961) used a mixture of CO and $CO_2$ to reduce $MoO_3$ to $MoO_2$. S. I. Sobol (1961) used hydrogen and CO under pressure at 200° C. to reduce $NaMoO_4$ to $MoO_2$. V. Angelova (1972) reacted molybdenite with $TiO_2$ at 500°–900° C. to produce $MoO_2$, $SO_2$ and elemental Ti. F. Zabo (1963) reduced $MoO_3$ with ammonia.

Although eleven oxides of molybdenum have been reported only $MoO_2$ and $MoO_3$ are commonly used. Roasting produces the $MoO_3$. Currently the $MoO_2$ is prepared by the reduction of $MoO_3$ with hydrogen at 300°–400° C.

OBJECTIVE OF THE INVENTION

The object of this invention is to provide a method or process to convert molybdenite, $MoS_2$, into molydenum dioxide, $MoO_2$. It is further objective to identify suitable agents which are abundant and cheap and which will effect the conversion at a moderate temperature and high yield.

SUMMARY OF THE INVENTION

The objects of this invention are provided by a process for producing molybdenum dioxide by reacting molybdenite with asphalt or pitch.

DETAILED DESCRIPTION OF THE INVENTION

I have discovered that when molybdenite, $MoS_2$, is heated with residual fuel oil, asphalt or pitch in the presence of air, the molybdenite is converted exclusively to molybdenum dioxide. The sulfur content burns off as $SO_2$. The temperature required is in the range of 400°–600° F. Typically, the molybdenite is produced by the concentration of molylybdenum ores and becomes available as a fine powder containing 54–55% Mo. The powdered molybdenite is mixed with the residual fuel oil, asphalt or pitch at a temperature above the softening point. Typically this can be 150° F. for residual fuel oil, 190° F. for asphalt and 240 F. for pitch. The molten mixture is heated to 400°–600° F. in the presence of air whereupon the mass ignites, the sulfur burns off to $SO_2$ and the molybdenum is converted exclusively to $MoO_2$.

TABLE 1

Properties of Pitches & Asphalts

| Name | Penetration @ 77° F. mm. | Kinematic Viscosity Centistokes @ 275° F. | Abs. Viscosity poises @ 140° F. | Flash Pt. °F. |
|---|---|---|---|---|
| Road Asphalt | 110 | 280 | 1000 | |
| Straight Run Asphalt | 77 | 300 | | 450 |
| Boiler Fuel | 50–60 | 300–500. | | |
| Petroleum Pitch | <10 | | | (softening pt., 220° F.) |
| Coal Tar Pitch | <10 | Vapor Press. <1 mm Hg. | Init. B. P. >500° F. | |

TABLE 2

Pumping Temperature of $MoS_2$ With Pitches or Asphalt.

| | |
|---|---|
| Road Asphalt | above 325° F. |
| Straight Run Asphalt | above 325° F. |
| Boiler Fuel | above 340° F. |
| Petroleum Pitch | above 350° F. |
| Coal Tar Pitch | above 375° F. |

Table 1 shows the properties of five different asphalts and pitches investigated. These range from road asphalt, the softest, penetration 110, to petroleum or coal tar pitches, less than 10.

One method of carrying out this reaction is to heat the mixture of $MoS_2$ and pitch in air to about 400°–600° F. at which temperature ignition takes place. Another method is to pump the heated molten mixture of $MoS_2$ and pitch into a heavy oil burner placed in a furnace or kiln. The mixture on contact with air reacts to form $MoO_2$, CO, $CO_2$ and $SO_2$. The solid $MoO_2$ is separated from the gaseous combustion products. Table 2 lists the pumping temperature of the mixtures investigated. In each case the temperature is low enough that the mixture can be pumped and reacted at the burner.

USEFULNESS OF THE INVENTION

In many applications, steel making for example, molybdenum is a desired ingredient. Since $MoO_2$ weighs 11% less than $MoO_3$, its cost of shipping is reduced and the amount of reducing agent is correspondingly reduced. $MoO_3$ typically requires roasting in air at 1200°–1500° F. and this requires considerably more heat to produce. The lower temperature of operation, 400°–600° F. compared to 1200°–1500° F. for roasting and the lower ratio of oxygen to molybdenum, makes the $MoO_2$ more desireable to manufacture and to ship. There is a cost associated with the use of asphalt or pitch, this however provides some of the heat energy to operate the reaction.

WORKING EXAMPLES

Example 1

A petroleum pitch having a softening point of 220° F. was heated to 350° F. Two parts of a molybdenite concentrate containing 54-55% Mo was stirred into one part of the molten pitch. The molten mixture was then heated to 600° F. in the presence of air. Inflammation occured and continued for twenty minutes. At this point the sulfur had all ben converted to sulfur dioxide and the $MoS_2$ converted to $MoO_2$. The excess carbonaceous material burned off. Analysis indicated a product that was exclusively $MoO_2$. No $MoO_3$ was found.

Example 2

A petroleum asphalt having a penetration of 110 mm. at 77° F., a kinematic viscosity at 275° F. of 280 centistokes and an absolute viscosity at 140° F. of 1000 was heated to 350° F. Two parts of Butte, Mont. molybdenite concentrate was stirred into one part of the molten asphalt and heated to 600° F. in the presence of air. Inflammation occured and continued for 20 minutes as the sulfur and excess asphalt burned off. Analysis indicated a product that was exclusively $MoO_2$.

Example 3

A petroleum straight run asphalt having a penetration of 77 mm. at 77° F. and a kinematic viscosity at 275° F. of 300 centistokes was heated to 350° F. Two parts of a Chandler, Idaho molybdenite concentrate was stirred into one part of the molten asphalt and heated to 600° F. in the presence of air. Inflammation occured and continued for 20 minutes as the sulfur and excess asphalt burned off. Analysis indicated a product that was exclusively $MoO_2$.

Example 4

A petroleum heavy fuel oil having a penetration of 50-60 mm. at 77° F. and a kinematic viscosity at 275° F. of 300-500 centistokes was heated to 350° F. Two parts of a Butte, Mont. molybdenite concentrate containing 54-55% Mo was stirred into one part of the molten fuel oil and heated to 600° F. in the presence of air. Inflammation occured and continued for 20 minutes as the sulfur and excess fuel oil burned off. Analysis indicated a product that was exclusively $MoO_2$.

Example 5

A coal tar pitch having a penetration of less than 10 mm. at 77° F. was heated to 350° F.. Two parts of a Butte, Mont. molybdenite concentrate containing 54-55% Mo was stirred into one part of the molten pitch and heated to 600° F. in the the presence of air. Inflammation occured and continued for 20 minutes as the sulfur and excess pitch burned off. Analysis indicated a product that was exclusively $MoO_2$.

I claim:

1. A method for converting molybdenite, $MoS_2$, into molybdenum dioxide $MoO_2$, which comprises mixing about two parts of powdered molybdenite into one part of a molten low volatile carbonaceous material, heating the mixture in the presence of air to 400°-600° F., allowing the sulfur content to evolve as sulfur dioxide, $SO_2$, and allowing the air to convert the molybdenum to molybdenum dioxide.

2. The method of claim 1 in which the low volatile carbonaceous material is residual petroleum fuel oil.

3. The method of claim 1 in which the low volatile carbonaceous material is petroleum asphalt.

4. The method of claim 1 in which the low volatile carbonaceous material is petroleum pitch.

5. The method of claim 1 in which the low volatile carbonaceous material is coal tar pitch.

* * * * *